Patented Nov. 5, 1935

2,019,490

UNITED STATES PATENT OFFICE 2,019,490

CYANAMIDE RESIN

Palmer W. Griffith, Elizabeth, N. J., assignor, by mesne assignments, to American Cyanamid Company, a corporation of Maine No Drawing. Application April 15, 1929, Serial No. 355,437

6 Claims. (Cl. 260—3)

This invention relates to condensation products of cyanamide with formaldehyde or its polymers, and particularly it relates to such materials as may be utilized as molding resins.

A free cyanamide solution is prepared by extracting cyanamide from any suitable source with water, filtering and making the filtrate neutral to methyl red. This solution, in general, is regulated to have an hydrogen ion concentration of less than $10^{-4}$. To the solution thus treated there is added a suitable quantity of formaldehyde solution with the formation of a copious white precipitate. This precipitate is then filtered off, chemically combined with water by treatment with a suitable acid, and, the resultant product is obtained in the form of a white precipitate, which upon drying, becomes crystalline. This crystalline product upon condensation with additional formaldehyde, forms a product which sets to a glassy resin after suitable heat treatment. If desired the second condensation with formaldehyde may be carried out in the presence of other substances which combine with the formaldehyde to give resinous products.

More specifically, a solution containing 36.7 parts cyanamide, by weight, and having a hydrogen ion concentration of about $10^{-6}$, is mixed with a solution containing 21.4 parts, by weight, of formaldehyde. A reaction takes place which is somewhat exothermic and the temperature rises to about 40° C. after a short time, and then gradually decreases to about 25° C. A precipitate is formed during the reaction which is complete in about one hour. The precipitate is then filtered off, washed, and dried at 60° C. for about 24 hours. The reaction which takes place may probably be expressed in its simplest form as follows:

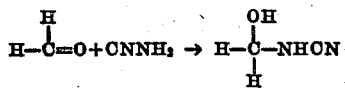

although it is believed that the reaction is much more complicated than that set forth, the reaction probably resulting in the formation of substituted cyanamides of complicated structure.

The precipitate prepared as just described is dissolved in weak hydrochloric acid and allowed to stand for about 48 hours at 60° C. On cooling and neutralizing the solution a white precipitate is obtained which, on drying, loses water and becomes crystalline. This treatment of the precipitate causes the chemical combination of the precipitate with water. Upon analyzing the original precipitate and the product after chemical combination with water, respectively, for nitrogen, it was found that the original product contained 44% nitrogen corresponding to the empirical formula $C_4N_4H_6O$; and the latter product contained 38.5% nitrogen corresponding to the empirical formula $C_4N_4H_8O_2$. These analyses would seem to indicate that the latter product is not mono-methylol urea, since the latter compound contains only 31.1% nitrogen.

The water-combined product may be formed into a resin by dissolving the product in formaldehyde. Upon heating the solution for a suitable period of time and evaporating, a material is obtained which sets to a glassy resin after heat treatment. However, the water-combined product is better adapted to form a molding resin if it is mixed with other ingredients prior to the second condensation with formaldehyde.

A molding powder may be prepared from the following ingredients:

| | Parts by weight |
|---|---|
| Formaldehyde (37% solution; 0.03% acidity as formic acid) | 58 |
| Ammonia (26° Bé.) | 1.6 |
| Thiourea | 18 |
| Water-combined cyanamide-formaldehyde product | 23 |

The ingredients are mixed together at about 60° C. and allowed to stand for 24 hours at about 40° C. Into the syrup formed, there is then kneaded 28 parts paper pulp and after complete mixing, the resulting mixture is dried for 5 hours at 70° C. and ground. The product passing through a 30 mesh screen is then molded at 50 lbs. steam pressure for 10 minutes under a pressure of 4,000 lbs. per sq. in. The resulting product is very hard and has a smooth glassy surface indicating that the molding powder is susceptible to utilization for many purposes.

Many of the conditions of operation may be varied within suitable limits. It has been found that the initial condensation of cyanamide with formaldehyde is best carried out when the cyanamide solution has a hydrogen ion concentration of less than $10^{-4}$, and preferably between pH6 and pH8. The proportion of cyanamide to formaldehyde may vary either way from an equimolecular basis. It is generally advisable although not necessary to use a slight excess of cyanamide. By varying the proportions of cyanamide to formaldehyde, the composition of the condensation product formed therefrom may also vary, without effecting the value of the products formed.

The initial condensation product of cyanamide with formaldehyde may be chemically combined with water in any suitable manner, preferably by means of a weak acid such as a dilute solution of hydrochloric acid. As has been pointed out, the water-combined product may be condensed with formaldehyde with or without the addition of other substances, to form suitable molding resins. In place of the thiourea mentioned, or in addition thereto, there may be added urea or other substitution products of urea or mixtures thereof.

The water-combined cyanamide-formaldehyde condensation product is also capable of forming resinous products by condensation thereof with various organic acids such as lactic, oleic, etc., or their anhydrides, and/or mixtures of the same. For instance, 128 parts of the water-combined product may be reacted with 60 parts of 25% acetic acid and the resulting product from this reaction is dried at 50° C.

Of course, the proportions of the various ingredients may be varied within wide limits in accordance with the properties desired in the final products. Any suitable filling materials or coloring materials may be used as desired.

Other suitable modifications and changes may be made in carrying out the invention without departing from the spirit and scope thereof, except as defined in the appended claims.

What I claim is:

1. The process which comprises preparing an unaltered cyanamide solution of pH4 to pH8, adding formaldehyde to said solution, separating the precipitate formed, and chemically combining the precipitate with water.

2. The process which comprises preparing an unaltered cyanamide solution of pH4 to pH8, adding formaldehyde to said solution, separating the precipitate formed, chemically combining the precipitate with water, recovering the water-combined product and reacting this product with formaldehyde.

3. The process which comprises preparing an unaltered cyanamide solution of pH4 to pH8, adding formaldehyde to said solution, separating the precipitate formed, chemically combining the precipitate with water, recovering the water-combined product and reacting this product with formaldehyde in the presence of an urea.

4. A crystalline condensation product prepared in accordance with the method of claim 1.

5. A resinous composition comprising a material prepared in accordance with the process of claim 2.

6. A resinous composition comprising a material prepared in accordance with the process of claim 3.

PALMER W. GRIFFITH.